May 19, 1931.  A. C. HARDY  1,806,198
METHOD OF AND APPARATUS FOR COMPARING AND
RECORDING RADIANT ENERGY
Filed May 2, 1928    2 Sheets-Sheet 1

May 19, 1931.                A. C. HARDY                1,806,198
         METHOD OF AND APPARATUS FOR COMPARING AND
                  RECORDING RADIANT ENERGY
              Filed May 2, 1928         2 Sheets-Sheet 2

Inventor
Arthur C. Hardy,
by Roberts Cushman Woodberry
Attys.

Patented May 19, 1931

1,806,198

UNITED STATES PATENT OFFICE

ARTHUR C. HARDY, OF WELLESLEY, MASSACHUSETTS, ASSIGNOR TO GENERAL ELECTRIC COMPANY, A CORPORATION OF NEW YORK

METHOD OF AND APPARATUS FOR COMPARING AND RECORDING RADIANT ENERGY

Application filed May 2, 1928. Serial No. 274,448.

This invention pertains to a method of comparing or measuring radiant energy (of which light, heat and electrical energy may be cited as examples) and for recording the results of such comparison or measurement, and to apparatus useful in the practice of such method, and in its more limited aspects relates to a method of and apparatus for comparing or measuring and recording radiant energy of wave lengths approximating those of light. Merely for convenience in description and as an illustrative example of one application of the broad principle underlying my invention I will hereafter refer more particularly to its use in colorimetry, that is to say, the comparision of color sample with one or another or with a standard of comparison and especially to the spectrophotometric analysis of a given color sample to determine the relative intensity, at any or all wave lengths, of the luminous radiations emanating from said sample, and for convenience in description the apparatus hereinafter referred to will be termed a "colorimeter".

Various methods of color comparison have heretofore been devised, but while there have been many suggestions in the prior art of methods of and devices for determining the specific color of a surface and of stating that specific color in terms such as definitely to identify the color referred to, so that the arts and industries may be informed of the exact color, I am aware of no system of the sort of sufficient convenience, sufficient accuracy, and sufficient freedom from the requirement for skilled operation of the estimator of the color to reach the large field of utility waiting for some such system. Painters, whether industrial or artistic, confectioners, decorators, dyers, dressmakers, potters, enamelers, electro-platers, fruit graders and packers, printers of wall paper, textile fabrics and colored illustrative or display books, pictures or posters; weavers and finishers of textile fabrics, the makers of pigments, paints, dyes and stains, as well as many others practicing industrial arts, are dependent upon guesswork or ocular estimation of the color of materials or of surfaces, in the absence of any accurate system of nomenclature, means for accurate mensuration of the chromatic appearances, or other system of standards relating to color adapted to serve as the basis of communication from one artisan to another, and upon which the color of a surface can be accurately described. This is a considerable handicap in each of these arts.

Among the various methods employed for color comparison may be mentioned systems of color sample cards, the Maxwell color disk, and spectrophotometric measurements, but none of these prior methods fully meets commercial requirements, since in many arts the color determination, to be of any real value must be made quickly and often by persons who are not of the highest discernment or technical ability. Furthermore, in all of the systems heretofore known to me the idiosyncrasy of the individual observer must always be reckoned with as an indeterminate factor in the results of the observation, it being well recognized that the retina of the human eye differs with each individual in its response to any given wave length of light. Moreover, the human eye is subject to fatigue which renders its response to color excitations even more uncertain, particularly when the eye is obliged to make a long series of comparisons, while the texture of the surface of color cards or similar means of comparison likewise affects the accuracy of the results of comparative observation. Even at best, the color card system, as ordinarily employed, and in the hands of a skilled observer furnishes but little assistance to the investigator desiring to know how to treat a given sample to make it match a selected standard. For example, in preparing dyestuffs for dyeing textile fabrics it is often a difficult matter to determine in what respect a dye sample fails to match a given standard, that is to say, whether it is necessary to add one color or another to the sample to make it match the standard and a mere comparison of the sample with a color card does not always indicate the remedy to be applied.

On the other hand, while the spectrophotometric method of determination is quite accurate (aside from the variable physiological error of the observer), it is very slow and laborious, since for accurate results it is often necessary to make several hundred individual observations which must then be plotted to indicate the result, and this method necessitates the employment of a skilled observer trained in the use of instruments of precision.

I have now discovered a method of comparing or measuring radiant energy in general and which I find particularly applicable to the comparison of the luminous energy of the spectrum and which is not affected by the color idiosyncrasy, fatigue or other physiological factors of the individual observer; which is applicable to the comparison of reflected, transmitted, or emitted light; which permits rapid comparison of a sample with a standard for determination of color or intensity at any or all wave lengths; which integrates the color of the entire exposed surface of the sample; which may if desired provide a record of the determinations; and which may be practiced by persons relatively unskilled in technical matters; and I have devised apparatus of simple and accurate character useful in the practice of this method.

Briefly stated, my method of comparison or measurement comprises the fundamental principle of causing radiant energy from the two sources which are to be compared, whether one of such sources is a standard or not (the energy being directed by any suitable means such, for example, as reflectors, lens systems, etc.) to fall upon an electrical device which is highly sensitive to radiant energy of the kind to be compared or measured and through which device there flows an electrical current which is dependent (in magnitude or potential or both) on the amount of such radiant energy which falls upon such device. In accordance with my method the energy from the two sources to be compared is caused alternately to fall upon a single sensitive electrical device, the rate of alternation being relatively rapid, for example, of the order of twenty or more cycles per second and thus, if the energy from the two sources to be compared be unequal, a pulsating current will be set up in the sensitive electrical device. This device may, for example, be a photoelectric cell, a bolometer, a radiometer or, in fact, any other device of the same general character in which current flow varies with the amount of radiant energy delivered to the device. Hereinafter, for convenience in description and illustration, I will refer to this device as a photoelectric cell but do not intend to limit myself to this particular instrument, although for my purpose I find it eminently satisfactory.

In making the comparison between the energy from the two sources I cause the pulsating current in the photoelectric cell to make its presence known, either through a suitable observing instrument or preferably by means of an electrically actuated device adapted to operate mechanical parts, usually amplifying this pulsating current by suitable means, for example, thermionic tubes or the like to enable it to actuate or control the desired mechanism. Having determined the existence of this pulsating current, either by means of an indicating instrument, as above noted, or mechanically, I proceed to vary the energy received from one or both of the sources until the energy from both sources (under the conditions selected for comparison, for example a predetermined wave length), as received at the photoelectric cell is substantially equal, which may be determined by the fact that under such conditions the pulsations in the current through the cell cease, and the current becomes constant. If, as above stated, I employ amplifying means between the cell and the observing instrument or other mechanism responsive to such pulsating current, the amplification ceases when the current becomes steady, and thus the indicating instrument or other mechanism functions or ceases to function as the case may be, thereby making it apparent that the energy received from each source is the same.

When my broad method, above described, is to be applied to colorimetry, I prefer to disperse beams of light on their way from each of the respective sources to the photoelectric cell so as to form extended alternating spectra, and I expose the cell progressively to the various parts of the spectrum bands, for instance, at certain definite range of wave lengths, beginning, for example, at the red end of the spectrum and progressing toward the violet end. At each point of exposure of the photoelectric cell to the spectrum, comparison is made of the intensities of the luminous radiations arriving from the respective sources, and this observation may be noted by reference to indicating instruments and recorded manually, such records afterward being plotted to form a color comparison curve, but preferably such a curve is formed mechanically and automatically by suitable mechanism, part of which at least is under the control of the pulsating current in the photoelectric cell.

For comparing samples of pigment or other opaque colored samples, it is necessary to employ reflected light and as a standard of comparison I find that either magnesium carbonate ($MgCO_3$) or magnesium oxide ($MgO$) furnishes a uniformly pure white. Preferably, though not necessarily, I dispose the source of light between the standard, for example a block of magnesium carbonate, and the sample to be compared, and direct beams of light from the source of light onto the standard and onto the sample respectively. I then direct beams of reflected light from the standard and sample onto a suitable device adapted alternately to cut off the light from each source and to permit the light from each source intermittently to pass through a narrow slit, and thence to a dispersing prism, diffraction grating, or other instrument for producing an extended spectrum band. By alternately cutting off the light from the standard and from the sample, I produce a flickering spectrum band which alternately represents the light from the standard and from the sample. I then expose the photoelectric cell or equivalent device to this band, preferably shielding the cell and providing, for example, a narrow slit which permits substantially monochromatic light (from but a limited area of the band) to impinge upon the cell at any given instant. Then, by adjusting the prism or grating, by the use of mirrors, by moving the cell, or by the use of a movable quartz rod or tube, I cause the light from the different parts of the spectrum successively to fall upon the cell.

In dealing with reflected light from a sample and standard, as above described, it is evident that the energy at the spectrum band, after dispersion of the reflected ray, may be exceedingly small and for this reason the sensitively responsive instrument, for example, the photoelectric cell, must be of such character that it will respond with great rapidity and with the utmost sensitiveness to minute variations in luminous energy falling thereon. It is also desirable that this sensitive instrument, whatever its nature, be quickly responsive to light waves of any length throughout the spectrum. It is quite possible to obtain a photoelectric cell which responds with the desired rapidity when exposed to light of substantially any wave length. For my purpose I find that a photoelectric cell is practical and gives results of sufficient accuracy.

Since the current value in this cell is extremely small, it is obviously of little value for directly indicating conditions or directly controlling auxiliary apparatus and thus, as above described, I prefer to amplify this current, preferably using several stages of amplification of the general type employed in audio frequency work.

The amplified current may be employed for operating or controlling any desired form of indicating instrument or appliance either directly or indirectly. When so employed the indicating instrument or appliance, whether of recording type or not, may be so arranged as to respond either to difference in intensity of energy received by the photoelectric cell from the standard and sample, respectively, or to respond only when the intensity of energy from both sources is equal. In the present instance I have chosen to illustrate the latter arrangement, employing the amplified current to keep a relay circuit open so long as there is a pulsating current through the photoelectric cell, but permitting the relay circuit to close when the amplified current ceases in response to cessation of pulsations in the photo cell circuit. This relay current may actuate any desired device, for example a lamp, a bell, or the like, but preferably operates a device for making marks upon a record sheet or plate.

The record sheet or plate may be moved continuously in a given direction by suitable motive means, for example a constant speed electric motor, and I prefer to synchronize the movement of this sheet or plate with means for flashing the light alternately from the two sources; with means for shifting the slit or other device whereby the photoelectric cell is progressively exposed to different parts of the spectrum; and with means for varying the relative intensity of the light from said sources.

A convenient mode of attaining the latter result is to illuminate the sample and test object by means of a lamp mounted upon a movable carriage which is reciprocated by said constant speed motor along a line connecting the sample and object. However, if preferred, the lamp may remain stationary and the sample and object may be moved relatively to the lamp, or other suitable means may be employed for varying the relative intensity of light from the sample and object. It is particularly to be noted that, by the present method, all idiosyncrasies of the photoelectric cell or other sensitively responsive device are eliminated since the comparisons of the standard and sample are made in such rapid succession that the characteristics of the cell may be regarded as constant for any given comparison. Moreover, as the cell is employed merely as a means for comparing the standard and sample, its absolute constants or characteristics have no effect on the result, so that even though the characteristics of the cell should slowly change,— records of observations made at different times will be alike.

As an alternative and equivalent arrangement to that above described, the sample and standard may be illuminated with monochromatic light, as for example by dispersing the light from the source, exposing the sample and standard progressively to light of different wave lengths in the spectrum band produced by such dispersion, and delivering the light reflected from the standard and sample in alternating flashes directly to the photoelectric cell.

Although it has been proposed to employ selenium cells in photometric work, I apprehend that such cells as ordinarily made at the present time have too great a lag in responding to rapid variations of light intensity to have any practical value for my purpose. On the other hand, the photoelectric cell responds with extreme rapidity, both to increase and decrease of light intensity, and I have found that devices of this character are eminently suitable for my purpose, but, I contemplate that other and equivalent quickly responsive and equally satisfactory devices may hereafter be found or devised and I regard the use of all such devices for the herein described purpose as falling within the purview of my invention.

In the accompanying drawings I have illustrated one desirable embodiment of my invention by way of example and in the drawings.

Figure 1:
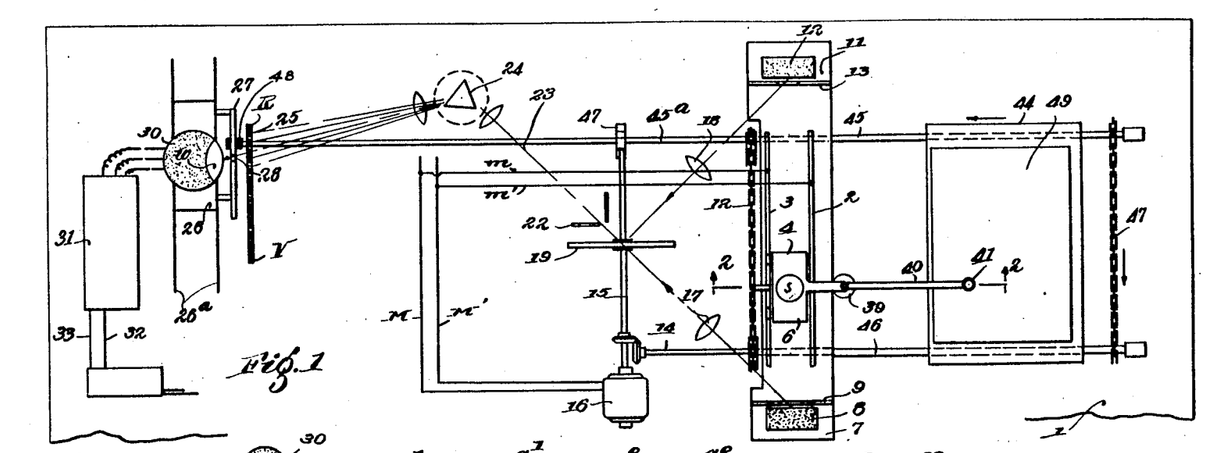
Fig. 1 is a diagrammatic plan view, with certain parts broken away, illustrating the complete apparatus and indicating the electrical circuits.
Figure 2:
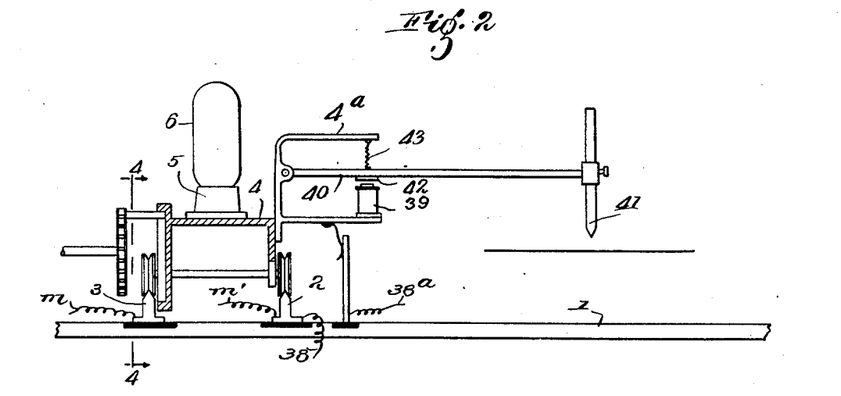
Fig. 2 is a vertical section, to larger scale, substantially on the line 2—2 of Fig. 1.

Referring to the drawings the numeral 1 designates a suitable base which is here shown as carrying the various elements of the apparatus together with the wiring forming the electrical circuits. It is to be understood that the arrangement shown in Fig. 1 is merely illustrative and that various parts or elements of the apparatus may be mounted upon separate supports and may, and preferably will in some instances, be widely separated.

At a suitable part of the base 1, I arrange a track comprising the spaced parallel rails 2 and 3 and on this track I mount a wheeled carriage 4 supporting the socket 5 in which may be mounted a lamp 6. This lamp may be of incandescent type, preferably having a flat filament which is disposed in a plane substantially at right angles to the length of the track. This lamp may be supplied with current in any suitable manner, as for example from mains M, M' connected by wires $m, m'$ to the rails 2 and 3.

At one end of the track I arrange a support 7 adapted to hold a standard of comparison indicated at 8. For color comparison, I find that a block of magnesium carbonate or of magnesium oxide constitutes a very desirable standard since these substances reflect a very pure white light. This block is provided with a substantially flat and vertical face for illumination by the lamp 6 and preferably I arrange a shield 9 between the block 8 and the lamp, such shield having a slit or aperture through which the vertical face of the block is exposed to the light from the lamp.

At the opposite end of the track I arrange a support 11 for the sample 12 which is to be compared with the standard 8. The support 11 is also provided with a guard 13 having a slit through which the light from the lamp may shine upon the sample.

The carriage is constantly reciprocated along the track during operation of the device by means of an endless chain $12^a$ having a pin $12'$ engaging a vertical slot $13^a$ in the frame of the lamp carriage. The chain 12 is constantly driven by a shaft 14 which is turned by the shaft 15 of a constant speed motor 16 conveniently receiving its current from the mains M, M'.

Figure 5:
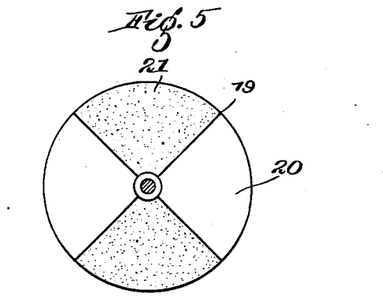
Fig. 5 is a front elevation of a light-flashing disk.

Beams of reflected light from the standard 8 and the sample 12 pass through suitable lenses 17 and 18, respectively, and fall upon a rotating disk 19 mounted on the shaft 15. This disk (Fig. 5) is provided with transparent sectors 20 which alternate with sectors 21 which are silvered so as to reflect the light passing through the lens 18 from the sample 12. The parts are so arranged that the light from the sample 12, after reflection from the silvered sector 21 passes along the same path 23 as the light from the standard 8 which is transmitted through the plane sectors 20 of the disk. By reason of the rapid alternation of the sectors 20 and 21, as the disk rotates, flashes of light from the standard 8 and sample 12 are alternately directed along the path 23 after passing through a narrow slit in a shield or guard 22. The narrow beam of light passing along the path 23 falls upon a dispersing device 24, for example, a prism or diffraction grating, and it thereby dispersed to form an extended spectrum band 25, the red end of which may, for example, fall at the point R. This spectrum band consists of alternating spectra formed of the reflected light from the standard 8 and sample 12 respectively, such spectra alternating in very rapid succession.

A carriage 26 is arranged to move along suitable guides $26^a$ in a path substantially parallel to the spectrum band 25 and this carriage preferably supports a shield 27 having a narrow slit 28. By movement of the carriage longitudinally of the band, this slit may be brought opposite to any desired part of the band. On the carriage 26 I mount a sensitively responsive device, for example, a photoelectric cell, or the like, in which electric current varies with variations in the intensity of the light which is received by the cell. I so arrange this cell that its window $w$ is disposed opposite to the slit 28 so that as the carriage reciprocates, the cell is exposed progressively to light of different wave lengths, representing different portions of the spectrum band.

Figure 3:
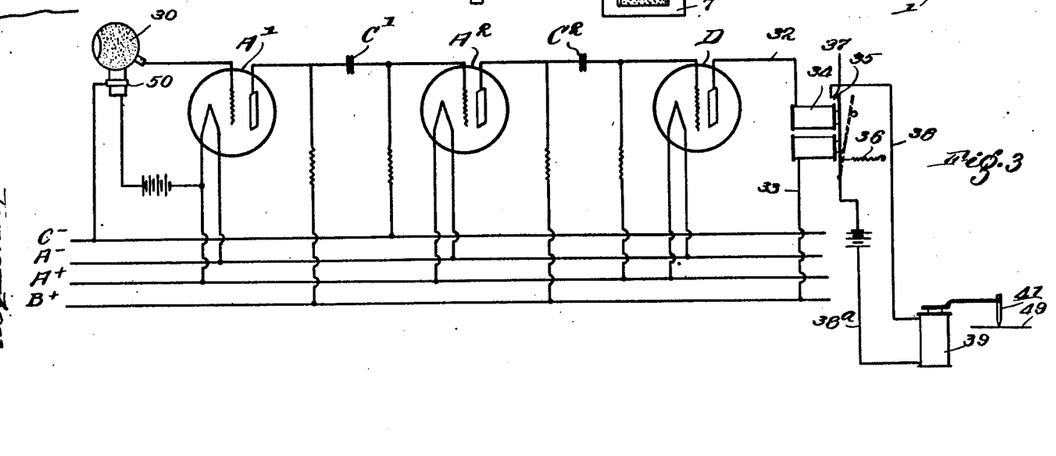
Fig. 3 is a diagram illustrating one desirable arrangement of amplifier circuit useful in connection with the apparatus of Fig. 1.
Figure 4:
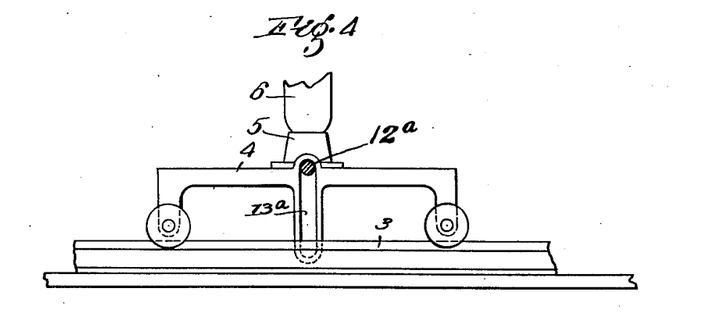
Fig. 4 is a side elevation of a lamp-supporting carriage, showing means for moving the same.

The current from the cell 30 is preferably amplified by passing it through an amplifier indicated generally at 31. As shown in Fig. 3 I have provided two stages $A^1$ and $A^2$ of amplification including condensers $C^1$ and $C^2$, and a detector D, employing thermionic tubes or equivalent devices of well-known character connected in suitable circuits which may be varied according to conditions, such circuits forming no essential part of the present invention. Preferably I provide the cell 30 with a metal guard ring 50 to prevent leakage of current over its surface, said ring being connected with the amplifier current as shown in Fig. 3. The unidirectional plate current of the detector D is conducted through wires 32 and 33 to the coils of a magnet 34 having an armature 35. When the current flowing through the coils of the magnet is below a predetermined amount, the armature is retained in the dotted line position of Fig. 3 by means of a spring 36. When the current in the magnet increases beyond such predetermined amount, the magnet pulls the armature over until it engages a contact 37 and closes a circuit through conductors 38 and 38ª, and an electromagnet 39 mounted upon the carriage 4.

The carriage 4 is provided with a bracket 4ª to which is pivotally connected an arm 40 carrying a movable indicator, preferably a stylus or other marking element 41. The arm 40 is normally held in elevated position by means of a spring 43. This arm carries the armature 42 of the magnet 39 and when the magnet is energized the armature, with the arm 40 is drawn down, thus moving the stylus 41 downwardly.

A record-supporting element 44 is disposed immediately below the stylus 41. While a cylindrical drum or other appropriate means might be employed as the record-supporting element, I have here shown this element as a substantially flat and rigid horizontal plate adapted to move horizontally in a path substantially at right angles to the path of movement of the carriage 4. This plate 44 is preferably supported upon parallel screw-threaded shafts 45 and 46 mounted to turn in suitable bearings carried by the base 1. These shafts are constrained to turn at the same speed by means of a connecting chain 47 or other suitable element.

The record-carrying element 44 is adapted to support a sheet of paper 49, wax tablet, or other record material with which the stylus 41 may cooperate to make a visible or permanent record, and I wish it to be understood that I have employed the term "stylus" as comprehensively designating my marking appliance.

The shaft 45 is extended, as indicated at 45ª beyond the shaft 15 of motor 16, and is provided with a worm wheel 47 driven by a worm on the shaft 15. The shaft 45 also carries a pinion 48 which actuates mechanism for slowly progressing the carriage 26 with the photoelectric cell 30 longitudinally of the spectrum band 25. The progression of the carriage may be slowly continuous, or intermittent, for example, such as would result from the interposition of a "Geneva" drive between the pinion 48 and the carriage.

In the operation of the device the standard 8 which, as above stated, is conveniently a block of magnesium carbonate having a smooth face opposed to the slit in the shield 9, is mounted on the support 7, while the sample 12 to be tested is mounted upon the support 11 with its surface exposed at the slit in the guard 13. The lamp 6 being lighted, its light passes in opposite directions and illuminates the standard 8 and the sample 12. The light reflected from the surfaces of the standard and sample passes through the lenses 17 and 18 respectively and by the rotation of the disk 19 is despatched in alternating flashes along the path 23 to the prism or other dispersing device 24. The prism disperses this light and forms the extended spectrum band at 25, it being assumed that the carriage 26 is in the position indicated in Fig. 1, where the aperture 28 is exposed to the red end of the spectrum, and that the carriage 4 is so disposed intermediate the standard 8 and the sample 12 that a greater amount of red light is reflected from the standard than from the sample, the energy represented by the flashes from the standard will be greater at the red end of the spectrum than the energy of the flashes received from the sample. Thus, the photoelectric cell 30 will be subject to alternating vibrations in energy so that a pulsating current will be set up in this cell. This current is amplified by passage through the amplifying circuit. So long as the current in the cell is pulsating, a minimum current flows in the plate circuit of detector D and through the coils of the magnet 34, so that the spring 36 holds the armature 35 away from the contact 37, thus breaking the circuit through the conductors 38 and 38ª and the magnet 39, and permitting the spring 43 to hold the arm 40 with the stylus 41 in elevated position. The reciprocation of the lamp-carrying carriage 4 is rapid as compared with the slow movement of the photoelectric cell 30 and the record-supporting element 44, and at some point in the travel of the carriage 4 the relative illumination of the standard and sample will be such that at that particular part (red end) of the spectrum band to which the photoelectric cell is then exposed, light of equal intensity will be received from the standard and sample producing a condition of balance. At the instant that this occurs, the pulsations of current in the photoelectric cell will cease, and the plate current in detector D will rise and energize the magnet coils 34 sufficiently to pull the armature over against contact 37 and close the circuit through the magnet 39, whereupon the stylus 41 will be moved downwardly and will make a mark or dot upon the surface of the record sheet 49. As the carriage 4 remains in constant motion, this condition of balance is usually but momentary, and immediately thereafter pulsating current is again set up in the photoelectric cell, the current through the magnet 34 drops, permitting spring 36 to break the circuit through the magnet 39, and the stylus rises. While these operations take place, the photoelectric cell progresses a short distance along the spectrum band, and as the carriage 4 continues to reciprocate, it again finds a position at which light of equal intensity from the standard and sample is delivered to the photoelectric cell, whereupon the above operations are repeated and the stylus registers another dot or mark. As the record sheet 49 is continuously moving and as the stylus is moving in a direction transverse to the movement of the record sheet, (the stylus being mounted upon the carriage 4) the result of successive periods of balance is to produce upon the record sheet a series of dots or marks which, if the reciprocation of the carriage 4 be sufficiently rapid, will form an almost continuous line. This line of dots takes the form of a curve which is characteristic of the color value of the sample under consideration and such curve may be employed for subsequent comparison of the sample with others, to determine change in color value of the sample over extended periods of time, or for other desired purposes.

While the arrangement above described is desirable and useful, I contemplate that various changes may be made therein without departing from the spirit of the invention. Thus, for example, in place of an electric motor for driving the various parts in synchronism, a motor of other type for instance, a fluid pressure motor, may be employed. I also contemplate that other and equivalent devices of highly sensitive character may be substituted for the photoelectric cell; that the exposure of the cell progressively to different parts of the spectrum band may be accomplished in many other ways than that here specifically shown; that other means may be provided for changing the relative intensity of light with which the sample and standard are illuminated as, for example, movement of the standard and sample relatively to a stationary lamp; that other means may be employed for delivering the alternating flashes of light from the standard and sample to the dispersing means; that other types of recording means may be substituted for that shown, or that, under some circumstances, the stylus may be replaced by any suitable indicating means for visual or audible observation of the condition of balance, or unbalance; that the dispersion of the light may take place before it is thrown upon the standard and sample, if preferred, or that non-chromatic light from the standard and sample may be delivered in alternation to the cell in other ways.

Various aspects of the invention disclosed herein are claimed in the Hardy and Cunningham application Serial No. 195,848, filed June 1, 1927, and entitled "Method of and apparatus for comparing and recording relative intensity of radiant energy."

I claim:

1. That method of comparing radiant energy from a test sample with energy from a standard which comprises as steps alternately delivering energy from the sample and standard to a sensitively responsive device in which an electrical current varies in accordance with the amount of radiant energy delivered to said device, progressively varying the energy delivered from both of said sources of energy until the current in said device substantially ceases to fluctuate, and automatically recording the point in such progressive variation in energy at which the current in said device substantially ceases to fluctuate.

2. That method of comparing radiant energy from different sources which comprises as steps alternately delivering flashes of energy from each source to a sensitively responsive device in which an electrical current varies in accordance with the radiant energy received by said device, amplifying the current from said device, and employing the amplified current in controlling the actuation of a recording element.

3. That method of determining the color characteristics of a test sample which comprises as steps illuminating the test sample and a standard of comparison to provide two sources of reflected light, alternately delivering reflected light of selected wave length from said respective sources to a sensitively responsive device in which an electrical current varies in accordance with the amount of luminous energy delivered to said device, amplifying said varying current, and employing said amplified current in controlling the actuation of recording means.

4. That method of determining the color characteristics of a test sample which comprises as steps illuminating the sample and a standard of color comparison from a common source of light, directing beams of reflected light from the sample and standard to a sensitively responsive element, relatively varying the light received by the standard and sample until light of equal intensity is delivered to said sensitively responsive element from the sample and standard respectively, and employing the sensitively responsive element for controlling the actuation of recording means.

5. That method of determining color characteristics of an opaque test sample which comprises as steps illuminating the sample, dispersing reflected light from the sample to form a continuous spectrum, exposing a sensitively responsive device, in which an electric current varies in accordance with the luminous energy received by said device, to a selected part of the spectrum of light reflected from the sample, amplifying the current in said device, and employing the amplified current in the actuation of indicator means.

6. That method of determining color characteristics of a test sample which comprises as steps illuminating the sample and a standard of comparison, dispersing light from the standard and sample to form extended spectra, exposing a sensitively responsive device, in which an electric current fluctuates in accordance with variations in luminous energy received by said device, alternately to the respective spectra at corresponding wave lengths thereof, amplifying the current in said device and employing the amplified current in the actuation of indicator means.

7. That method of determining the color characteristics of light reflected from a test sample which comprises illuminating said sample and a standard of comparison, delivering reflected beams alternately and in rapid succession from the sample and standard respectively to dispersing means whereby alternately to form an extended spectrum of each reflected beam, and comparing the intensity of illumination at a series of points in one spectrum with a corresponding series of points in the other spectrum.

8. That method of determining the color characteristics of a test sample which comprises as steps delivering beams of light from said sample and from a standard of comparison, dispersing said beams to form extended spectra, exposing a sensitively responsive device in which an electric current varies in accordance with the luminous energy received by said device alternately to a corresponding part of each spectrum, amplifying the current in said device, and utilizing the amplified current in comparing the relative intensity of illumination at corresponding points of the two spectra.

9. That method of determining the color characteristics of light reflected from a test sample which comprises as steps illuminating said sample and a standard of comparison, delivering reflected beams from the sample and standard respectively alternately and in rapid succession along the same path to dispersing means thereby forming alternating spectra of the two reflected beams at substantially the same position, progressively exposing a photoelectric cell from one end to the other of the alternating spectra, and varying the intensity of the reflected beam from the standard until at each point of exposure the current in the photoelectric cell becomes substantially constant.

10. That method of determining the color characteristics of light reflected from a test sample which comprises as steps illuminating said sample and a standard of comparison to provide two sources of reflected light, delivering reflected beams from the sample and standard respectively alternately and in rapid succession along the same path to dispersing means thereby forming alternating spectra of the two reflected beams at substantially the same position, exposing a photoelectric cell to said alternating spectra at a predetermined and corresponding part thereof, and varying the intensity of the beam from one of said sources until the current becomes substantially constant in the photoelectric cell.

11. That method of determining the color characteristics of a test sample which comprises as steps delivering beams of light from said sample and from a standard, respectively, dispersing said beams of light to form extended spectra, exposing to said spectra in alternation and at corresponding points of said spectra a sensitively responsive device in which an electrical current varies in accordance with the amount of radiant energy delivered to said device, and progressively varying the relative amount of light from the sample and standard until the current in said sensitively responsive device substantially ceases to fluctuate.

12. That method of determining the color characteristics of light reflected from a test sample which comprises illuminating said sample and a standard of comparison, delivering reflected beams alternately at a predetermined rate and in rapid succession from the sample and standard respectively to dispersing means whereby alternately to form an extended spectrum of each reflected beam, exposing a photoelectric cell at a series of points along one of said spectra and at a corresponding series of points along the other spectrum and utilizing the current in the photoelectric cell in comparing the relative intensity of illumination at corresponding points of the two spectra.

13. That method of determining the color characteristics of a test sample which comprises as steps delivering beams of light from the sample and a standard of comparison, dispersing said beams to form extended spectra, exposing a photoelectric cell to said spectra, in alternation and at a series of points in each spectrum, amplifying the current in said cell, and adjusting the relative intensity of light from the sample and standard respectively at each point of comparison of the spectra until the current in the cell ceases to fluctuate.

14. That method of determining the color characteristics of a test sample which comprises as steps illuminating the sample and a standard of comparison, delivering beams of reflected light from said sample and standard, dispersing said beams to form extended spectra, exposing to said spectra, in alternation, a sensitively responsive device in which an electrical current varies in accordance with the luminous energy received by said device, amplifying the current in said device, and varying the relative amount of illumination delivered to the sample and standard until the amplified current ceases to fluctuate.

15. That method of determining the color characteristics of a test sample which comprises as steps illuminating the sample and a standard of color comparison from a common source of light, dispersing beams of reflected light from the sample and standard to form extended spectra, exposing a photoelectric cell alternately to corresponding points of said spectra, varying the light received by the standard and sample until light of equal intensity is deliverd at said cell from the sample and standard respectively, and utilizing the current in the cell for indicating such equality of light intensity.

16. That method of determining the color characteristics of a test sample which comprises as steps illuminating the sample and a standard of color comparison, dispersing beams of reflected light from the sample and standard to form extended spectra, exposing a photoelectric cell alternately to corresponding points of said spectra, varying the light received by the standard and sample until light of equal intensity is delivered to the cell from the sample and standard respettively, and utilizing the current in the cell for recording the light intensity relation of the sample and standard at which light of equal intensity is deliverd to the cell.

17. That method of comparing and recording light reflected from two spaced surfaces which comprises as steps moving a record element in a direction substantially at right angles to the line connecting said surfaces, moving a second record element along a path substantially parallel with said connecting line, moving a light for illuminating said surfaces along said connecting line in timed relation to the movement of the stylus, directing light reflected from the two surfaces to a common receiving element, and causing the second record element to mark the first record element whenever light of equal intensity is delivered from the two surfaces to said receiving element.

18. Apparatus for comparing luminous energy from a test sample with energy from a standard source of energy respectively, comprising means for delivering alternate flashes of energy from the sample and a standard of comparison to a sensitively responsive device in which electrical current varies with the amount of radiant energy received by such device, means for progressively adjusting the energy delivered from the standard source and test sample until the current in said sensitive device becomes substantially constant, and means for recording the point in such progressive adjustment of energy at which the current in said device substantially ceases to fluctuate.

19. Apparatus for comparing radiant energy from different sources comprising a device in which an electrical current varies in accordance with changes in radiant energy received by said device, means for alternately delivering flashes of energy from each of said sources to said device, means for amplifying the current from said device, and a recording device controlled by said amplified current.

20. Apparatus for determining color characteristics of a test sample comprising a sensitively responsive device in which an electric current varies in accordance with the luminous energy received by said device, means for alternately flashing light of a limited range of wave lengths upon the sensitively responsive device from the sample and a standard of comparison respectively, and record means automatically operative in response to cessation of current variation in the sensitively responsive device.

21. Apparatus for determining color characteristics of a test sample comprising a photoelectric cell, means for alternately flashing light of a limited range of wave lengths upon the cell from the sample and a standard of comparison, respectively, and record means automatically operative in response to cessation of current in the cell.

22. Apparatus for determining color characteristics of a test sample comprising a photoelectric cell, means for alternately flashing light of a selected and definite wave length upon the cell from the sample and a standard of comparison respectively, means for amplifying the current in the cell, and indicator means whose operation is initiated whenever current ceases to flow in the photoelectric cell.

23. A colorimeter apparatus comprising means for delivering light of a predetermined wave length in alternating flashes from a test sample and a standard white surface respectively to a photoelectric cell, means for varying the relative intensity of illumination of the sample and standard, a recording element, and means controlled by the current in the photoelectric cell for actuating the recording element only when light at said predetermined wave lengths, delivered to the photoelectric cell from the sample and standard, respectively, is of equal intensity.

24. Apparatus of the class described comprising a photoelectric cell, means for exposing said cell alternately to light of a selected wave length received from a test sample and a standard of comparison respectively, a normally stationary recording element, and means which operates only when the current ceases to fluctuate in said cell, to move said recording element.

25. Apparatus for determining color characteristics of a test sample comprising a photoelectric cell, means for alternately flashing light of a definite and selected wave length upon the cell from a sample and a standard of comparison respectively, means for amplifying the current in the cell, and means including a part which moves whenever the current in the cell ceases for indicating the relative intensity of light at the selected wave length from the standard and sample.

26. Apparatus for use in comparing the color of a sample with the color of a standard of comparison comprising a photoelectric cell, means for exposing said cell alternately to light of a selected limited range of wave lengths received from two sources respectively, a recording stylus, and means responsive to cessation of current pulsations in the cell for controlling the operation of said stylus.

27. A colorimeter comprising means for dispersing light to form a spectrum, a light sensitive electrical device in which current fluctuates with variations in the intensity of light received by said device, the device being sensitively responsive to light of substantially all visible wave lengths, automatic means for exposing said device progressively to various parts of the spectrum, means for amplifying the current in said device, and means controlled by the amplified current for recording the intensity of illumination at successive points in the spectrum.

28. A colorimeter comprising means for dispersing light from a test sample to form an extended spectra, a photoelectric cell, a shutter having a slit therein, said shutter being movable to progress the slit longitudinally of the spectrum, means for moving the shutter whereby successively to transmit light from various parts of the spectrum to the photoelectric cell, and means controlled by said photoelectric cell for recording the intensity of illumination at each of the successive portions of the spectrum from which light is transmitted.

29. Apparatus of the class described comprising a sample to be tested, means for directing a beam of light from the sample to dispersing means thereby to form an extended spectrum, a photoelectric cell arranged to receive light from a predetermined part of the spectrum, and means for shifting the cell relatively to the spectrum whereby to expose the cell progressively to light of different wave lengths.

30. Apparatus for determining the color characteristics of a test sample comprising means for supporting said test sample, means for supporting a standard of comparison, means for illuminating the sample and the standard, a dispersing device, means for delivering alternate flashes of reflected light from the sample and the standard to the dispersing device thereby to form alternating spectra, and a photoelectric cell exposed to said alternating spectra.

31. Apparatus of the class described comprising a support for a sample to be tested, dispersing means, means for directing a beam of light from the sample to the dispersing means whereby to form an extended spectrum, a photoelectric cell arranged to receive light from a selected part of said spectrum, a recording element, and means under control of the current in the photoelectric cell for actuating the recording element.

32. Apparatus of the class described comprising a support for a sample to be tested, dispersing means, means for directing a beam of light from the sample to the dispersing means thereby to form an extended spectrum, a motor device, a photoelectric cell, means actuated by the motor device for shifting the cell relatively to the spectrum whereby to expose the cell progressively to light of different wave lengths, a record element and stylus, means actuated by the motor device for moving the record element and stylus in paths substantially at right angles to each other, and means responsive to the current in the photoelectric cell for causing the stylus to mark the record element.

33. Apparatus for determining the color characteristics of light reflected from a test sample comprising means for supporting a sample and a standard of comparison, means for illuminating both standard and sample, means for dispersing light to form a spectrum, means for alternately directing flashes of reflected light from the sample and standard toward the dispersing means whereby to form alternating spectra of the sample and standard, and means for comparing the relative intensity of illumination at a series of corresponding points along the two spectra.

34. Apparatus for determining the color characteristics of light from a test sample comprising means for supporting a sample and a standard of comparison, dispersing means, means for directing beams of light from the sample and standard to the dispersing means whereby to form extended spectra of the light from the sample and standard respectively, a photoelectric cell, means for exposing the cell alternately to the spectra from the standard and sample, and means responsive to the current in the photoelectric cell for indicating a difference in intensity of the light at corresponding points in the two spectra.

35. Apparatus for determining the color characteristics of light reflected from a test sample comprising means for supporting a sample and a standard of comparison, means for dispersing light to form a spectrum, means for alternately directing flashes of light from the sample and standard along the same path toward the dispersing means whereby to form alternating spectra of the sample and standard, a photoelectric cell exposed to said spectra, an indicator means responsive to cessation of fluctuation of current in the photoelectric cell.

36. Apparatus for determining the quality of light reflected from a test sample comprising a movable lamp, means for supporting the sample and a standard of comparison, means for directing light from the lamp to the standard and the test sample respectively, means for dispersing light to form a spectrum, rotary means for alternately delivering flashes of reflected light from the test sample and standard, respectively, to the dispersing means to form spectra, a photoelectric cell exposed to said spectra means for amplifying the current from said cell, means moving in synchronism with the rotary flash-producing means for rapidly reciprocating the lamp toward and from the standard whereby to vary the relative intensity of light from the sample and standard, and means for indicating cessation of fluctuation in current in the photoelectric cell.

37. Apparatus for determining the color characteristics of light reflected from a test sample comprising means for supporting the sample and a standard of comparison, a lamp interposed between the sample and standard for illuminating them, a movable carriage for the lamp, dispersing means, a rotary element for flashing beams of reflected light alternately from the sample and standard to dispersing means whereby to form alternating spectra of the sample and standard respectively, a photoelectric cell, a motor device, means actuated by the motor device for slowly shifting the cell relatively to the spectra whereby to expose the cell progressively to light of different wave lengths, and means actuated by the motor for turning the rotary flash-producing element and for reciprocating the carriage.

38. Apparatus for determining the color characteristics of light from a test sample comprising means for supporting the sample and a standard of comparison, means for dispersing light to form a spectrum, means for producing flashes of light alternately from the sample and standard and directing such flashes along the same path toward the dispersing means whereby to form alternating spectra of the sample and standard, a photoelectric cell exposed to said spectra, a motor device, means actuated by the motor device for shifting the cell relatively to the spectra whereby to expose the cell progressively to light of different wave lengths, a record element and stylus movable in paths substantially at right angles to each other, a motor, means actuated by the motor for operating the flash-producing means, the record element and stylus, and the means for shifting the photoelectric cell, and means responsive to the current in the photoelectric cell for causing the stylus to mark the record element.

39. Apparatus for determining the color characteristics of light reflected from a test sample comprising means for supporting a sample and a standard of comparison, a lamp for illuminating both sample and standard, means for dispersing light to form a spectrum, a rotary disk arranged to produce alternating flashes of light from the sample and standard respectively, said flashes being converted by the dispersing means into extended alternating spectra of the sample and standard, a motor for driving the disk, a photoelectric cell movable longitudinally of the spectra whereby to expose it to light of different wave length, a carriage for supporting the lamp, said carriage being movable to vary the relative illumination of the sample and standard, a record element movable in path substantially at right angle to that of the carriage, a stylus mounted on the carriage, means under control of the current in the photoelectric cell for causing the stylus to mark the record element under predetermined conditions of current flow in the cell and means actuated by the motor for slowly moving the cell, for rapidly reciprocating the carriage, and for moving the record element all in synchronism with the rotary, flash-producing disk.

40. That method of color comparison which comprises as steps varying the intensity of light from one of two sources until at a selected wave length the intensity from the two sources is substantially the same, and causing a recording element to move in synchronism with the variation in light intensity.

41. That method of color comparison which comprises as steps comparing the intensity of light of corresponding wave length from two sources, and automatically recording the results of such comparison.

42. That method of color comparison which comprises as steps making a plurality of successive comparisons of the intensity of light from two sources, each comparison being between light of substantially the same wave length from the respective sources, successive comparisons being between light of different wave lengths and automatically plotting the results of successive comparisons to form a record.

43. Apparatus of the class described comprising means for comparing the color of light from two sources, and means controlled by the comparing means for automatically recording the results of such comparison.

44. Apparatus of the class described comprising means for comparing radiant energy of corresponding selected wave length from two sources, and means controlled by the comparing means for automatically recording the results of such comparison.

45. Apparatus of the class described comprising means for dispersing light from each of two sources whereby to form extended spectra, means for comparing the intensity of illumination at corresponding parts of said spectra, and means controlled by the comparing means for automatically recording the results of such comparison.

46. Apparatus of the class described comprising means for dispersing light from two sources to form extended corresponding spectra, means for making a series of comparisons of the intensity of illumination of corresponding parts of said spectra, beginning at one end of the spectra and proceeding toward the other end, and means responsive to said comparison making means for automatically plotting the results of such successive comparisons, showing intensities plotted against corresponding wave length.

47. Apparatus of the class described comprising means for comparing the intensity of light of corresponding wave length from two sources, and means under control of said comparing means for automatically and successively recording the results of such comparison at a plurality of different wave lengths.

48. Apparatus of the class described comprising means for making a plurality of successive comparisons of the intensity of light from two sources, each such comparison being between light of approximately the same wave length from the respective sources, successive comparisons being between light of different wave length, and means under control of said comparing means for automatically recording the results of such successive comparisons.

49. Apparatus of the class described comprising means for making a plurality of successive comparisons of the intensity of light from two sources, each such comparison being between light of approximately the same wave length from the respective sources, and successive comparison being between light of different wave length, and relatively movable elements, one at least of which is controlled by said comparing means, for automatically plotting the results of such successive comparisons.

50. Color determining apparatus of the class described comprising a spectro photometer adapted to compare light intensity of corresponding wave length from two sources, and means operating in response to the comparing means for recording the results of such comparison.

51. Apparatus of the class described comprising a spectro photometer of flicker type adapted to make a series of comparisons in rapid succession of light intensity of corresponding wave length from two sources, and means operating in response to the comparing means for automatically recording such results.

52. In the art of determining the color characteristics of a test sample which employs a sensitively responsive device and a standard of comparison, the method of illuminating the test sample and the standard to provide sources of light, alternately delivering light from said sources to the sensitively responsive device in which an electrical current varies in accordance with the amount of luminous energy delivered to said device, amplifying said varying current, varying the amount of light delivered from one of said sources, and employing said amplified current in recording the variation in light.

53. In the art of comparing radiant energy from different sources which employs a sensitively responsive device, the method of alternately delivering flashes of energy from each source to the sensitively responsive device in which an electrical current varies in accordance with the radiant energy received by said device, amplifying the current through said device, varying the energy received from one of said sources and recording said variation, and employing said amplified current to determine the amount of variation.

54. Apparatus for determining color characteristics of a test sample comprising a photoelectric cell, means for alternately flashing light of a selected wave length upon the cell from the sample and a standard of comparison respectively, means for amplifying the current in the cell, and means employing the amplified current for determining variations in the luminous energy delivered from the standard to the cell.

55. Apparatus for determining the color characteristics of light reflected from a test sample comprising means for supporting a sample and a standard of comparison, means for illuminating both sample and standard, means for dispersing light to form a spectrum, means for alternately directing flashes of reflected light from the sample and standard along the same path toward the dispersing means whereby to form alternating spectra of the sample and standard, a photoelectric cell exposed to said spectra, and automatic means for adjusting the intensity of the flashes from the standard until the current in the photoelectric cell becomes substantially constant.

56. Apparatus of the class described comprising a flicker photometer for comparing light from two sources, and means responsive to the operation of the comparing means for automatically recording the results of such comparison.

57. Apparatus for determining the color characteristics of light reflected from a test sample comprising means for supporting a sample and a standard of comparison, means for illuminating both sample and standard, means for dispersing light to form a spectrum, means for alternately directing flashes of reflected light from the sample and standard along the same path toward the dispersing means whereby to form alternating spectra of the sample and standard, a photoelectric cell exposed to said spectra, and automatic means for adjusting the intensity of the flashes from the standard until the current in the photoelectric cell becomes substantially constant.

58. Apparatus for determining the color characteristics of a test sample comprising means for supporting said test sample, means for supporting a standard of comparison, means for illuminating the sample and the standard, a dispersing device, means for delivering alternate flashes of reflected light from the sample and the standard along the same path to the dispersing device thereby to form alternating spectra, and a photoelectric cell exposed to said alternating spectra.

59. Apparatus for comparing luminous energy from a test sample and a standard source of energy respectively, comprising means for delivering alternate flashes of energy from the sample and a standard of comparison to a sensitively responsive device in which electrical current varies with the amount of radiant energy received by such device, means for progressively adjusting the energy delivered from the standard source until the current in said sensitive device becomes substantially constant, and means for recording such progressive adjustment of energy.

Signed by me at Boston, Massachusetts, this 25th day of April, 1928.

ARTHUR C. HARDY.